3,158,521
PRODUCTION OF BONDED BODIES OF AT LEAST TWO DIFFERENT HALOGENATED NATURAL OR SYNTHETIC RUBBER BODIES
Max Goecke, Bad Homburg vor der Hohe, and Rudolf Nagelschmidt, Hanau (Main), Germany, assignors to Deutsche Gold- und Silber-Scheideanstalt vormals Roessler, Frankfurt am Main, Germany
No Drawing. Filed Mar. 3, 1960, Ser. No. 12,515
Claims priority, application Germany, Mar. 3, 1959, D 30,104
12 Claims. (Cl. 156—310)

The present invention relates to an improved process for the production of bonded bodies of at least 2 different halogenated natural or synthetic rubber bodies.

The production of bonded bodies of 2 or more if desired different synthetic rubber layers is known. However, the previously known procedures for the production of bonded bodies from at least 2 different halogenated natural or synthetic rubbers often exhibited only very low adhesion between the layers so that the technological requirements were not always fulfilled.

According to the invention it was unexpectedly found that bonded bodies in which the individual layers very firmly adhere to each other can be produced from two different halogenated natural or synthetic rubbers when the layers to be joined are heat and/or pressure treated in the presence of (A) a di- or polyisocyanate and (B) a compound containing at least two —N=C< groups in noncyclic linkage and/or (C) a N,N'-dimethylol compound.

The process according to the invention is also applicable to such layers of halogenated natural or synthetic rubber which are provided with a carrier of natural or synthetic fibres, such as cotton, silk, cellulose derivatives, polyamide, polyester and the like fibres, as well as fabrics, felts or fleeces thereof.

The process according to the invention can be carried out so that each of the layers to be joined contains the materials A and B and/or C. It, however, may be of advantage if one of the layers contains material A and the other B and/or C. Furthermore, it is also possible to provide one of the materials A or B and/or C as an intermediate layer whereas the other material is present in the layers to be joined.

The application of one of the materials A, B and/or C as an intermediate layer may, for example, be accomplished by painting a solution of such material in an inert solvent, such as benzene, ethyl acetate and the like, on one of the layers to be joined. Thereafter the other layer of the other type of rubber can be applied thereover. This, for example, can be accomplished by painting, dipping, calendering and the like. It is irrelevant whether the layers to be joined have already been vulcanized or are in the unvulcanized or uncross-linked state. It is advantageous, however, to vulcanize all layers simultaneously when assembled.

The production of the joint is effected by simple application of heat and/or pressure. While the simultaneous application of heat and pressure is not necessary, it in many instances is expedient. If the production of bonded bodies is effected by the painting method, it is generally preferable to effect the bond only by heating.

The following are illustrative of the natural or synthetic halogenated rubbers which may be joined according to the invention: poly-2-chlorobutadiene, chlorosulfonated polyethylene, chlorosulfonated propylene, chlorinated natural rubber or rubber hydrochloride. Preferably, poly-2-chlorobutadiene, chlorosulfonated polyethylene and chlorinated natural rubber are processed according to the invention. The corresponding bromine and fluorine containing polymers, such as polychloro trifluoro ethylene, can also be processed according to the invention. In addition, copolymers, such as those of hexafluoro propylene and vinylidine fluoride, and polymer mixtures of these materials can be processed according to the invention.

The compounds containing at least two —N=C groups which are employed according to the invention are generally of the following formula:

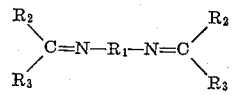

wherein $R_1$ can represent an aliphatic radical containing 1–18 carbon atoms, an aromatic radical containing up to 24 carbon atoms, an araliphatic radical containing up to 24 carbon atoms, a cycloaliphatic radical containing up to 24 carbon atoms or a heterocyclic radical containing up to 20 carbon atoms. The carbon atoms of such radical $R_1$ in addition to being bonded to hydrogen can also be bonded to oxygen, nitrogen, sulfur or phosphorus.

$R_2$ and $R_3$ can be hydrogen or have the same significance as $R_1$. When $R_2$ and $R_3$ are other than hydrogen they can be joined together by bridges or cyclically. Preferably, $R_1$ is an alkyl radical containing 2–10 carbon atoms which, however, can be interrupted with heteroatoms such as secondary or tertiary nitrogen. $R_2$ and $R_3$ preferably are hydrogen or aliphatic, aromatic, araliphatic, cycloaliphatic or heterocyclic radicals containing up to 12 carbon atoms.

The so-called Schiff's bases obtained from di- or polyamines and aldehydes and/or ketones are representatives of compounds containing at least two —N=C< groups. Preferably, di- or polyamines are employed which contain at least two terminal primary amino groups. Simple diamines such as ethylene diamine, propylene diamine, butylene diamine, hexamethylene diamine and the like are of special significance. Amines in which the carbon chain is interrupted with one or more secondary amino groups can also be used with success. Examples of such amines, for instance, are diethylene triamine, dipropylene triamine, tetramethyl pentamine, melamine and the like. Of course, mixtures of amines can also be used.

The following aldehydes and ketones can, for example, be used for the production of the —N=C< group containing compounds from such amines: cyclohexanone, methyl ethyl ketone, ethyl amyl ketone, acetophenone, acetyl acetone, acetone dicarboxylic acid, dimethyl ester, acetoacetic acid ester, acetaldehyde, benzaldehyde, acrolein, crotonaldehyde, furfural, glyoxal, butyraldehyde, salicyl aldehyde and higher ketones such as methyl nonyl ketone.

The —N=C< group containing compound can also be obtained by reacting di- or polynitroso compounds with compounds containing a methylene group containing active hydrogen. Representatives of suitable nitroso compounds, for example, are p,p'-dinitrosobiphenyl, p-dinitrosocyclohexane, dinitrosopentamethylene tetraamine and the like. Representatives of suitable active hydrogen methylene group containing compounds, for example, are: acetyl acetone, acetoacetic acid ester, malonic acid diethyl ester, pyruvic acid methyl ester and the like.

Among the N,N'-dimethylol compounds which can be employed according to the invention, those of the following general formulae are particularly suited:

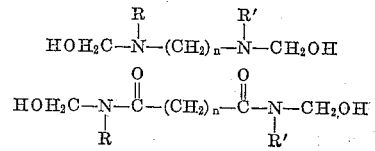

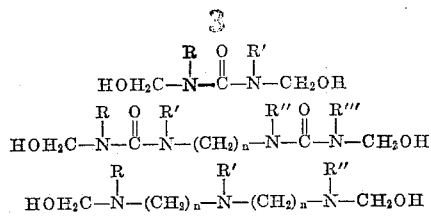

Such dimethylol compounds are fully described in copending application S.N. 2,855, filed January 18, 1960, in connection with the improvement of the properties of, for example, polyvinyl chloride compositions.

Accordingly the N,N'-dimethylol compounds according to the invention, as set out above, and in applicants' referred to copending application S.N. 2,855, filed January 18, 1960, are defined more specifically as to the terms of the monomeric N,N'-dimethylol polyamine compounds of the general formulae, as indicated above in columns 2 and 3 as follows:

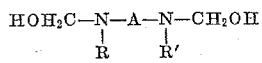

wherein A is a divalent radical selected from the group consisting of

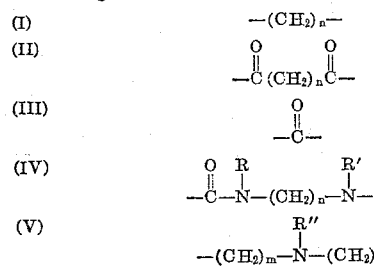

wherein each of R and R' taken separately are selected from the group consisting of hydrogen, aliphatic radicals containing 1-18 carbon atoms, aromatic radicals containing up to 24 carbon atoms, araliphatic radicals containing up to 24 carbon atoms, and alternatively R and R' may form a closed ring; R" is the same as R and R' taken separately; $n$ is a number from 0 to 18 and $m$ is a number from 2 to 8.

Hexamethylene diamine-isocyanate, toluidine isocyanate, triphenyl methane triisocyanate, methylene-bis-(4-phenyl-isocyanate), methylene-bis-(4-xylyl-isocyanate) and naphthalene diisocyanate can, for example, be employed according to the invention, as the isocyanate component.

The quantities of compounds A, B and/or C used preferably are 0.1 to 8% by weight, preferably 0.2–4% by weight, with reference to the polymer content of the masses to be joined.

It is also possible to produce bonded bodies from layers of masses containing fillers and/or pigments in quantities up to 200% by weight based upon the polymer contained in the mass. All types of carbon black, such as flame black, coloring black and gas black, as well as active highly disperse and aftertreated carbon blacks, can be used as fillers. In addition, highly disperse metal or metalloid oxides, preferably silica obtained pyrogenically in the gas phase or oxides or silicates obtained by precipitation, are suitable as fillers. The use of inactive fillers alone or in combination with active fillers in some instances is of advantage. Often it is expedient to add fibrous materials, such as textile fibres, asbestos or glass fibres, either alone or together with the fillers.

It is also possible to add the usual plasticizers, softeners and light and heat stabilizers to the compositions according to the invention.

Furthermore, known vulcanizing agents, such as sulfur and/or organic sulfur compounds, especially those of the thiuram, thiocarbamide and xanthate types, can also be added with advantage to the compositions according to the invention. The quantities employed can be between 0.1–8% by weight based upon the polymer content. The addition of such vulcanizing agents renders it possible to produce masses having an especially high modulus.

The following examples will serve to illustrate several embodiments of the invention. In such examples the proportions are given in parts by weight unless indicated otherwise.

*Example 1*

A mass consisting of:

100 parts poly-2-chlorobutadiene
30 parts gas black
6 parts Plastikator FH (an aromatic polyether obtainable from Bayer)
5 parts zinc oxide
4.8 parts reaction product of hexamethylene diamine and benzaldehyde
1.3 parts reaction product of p,p'-dinitroso biphenyl and malonic acid ester
0.8 part sulfur
0.1 part tetramethyl thiuram disulfide
0.3 part piperidine cyclopentamethylene dithiocarbamate
4.0 parts triphenyl methane triisocyanate
1.0 part methylene-bis-(4-phenyl-isocyanate)

was dissolved in a solvent composed of:

20 parts toluene
60 parts xylene
40 parts ethyl acetate
20 parts benzine 80/110 and painted on a tightly woven cotton fabric. The solvent was driven off by heating gradually up to 120° C.

Thereafter a second mass composed of:

100 parts chlorosulfonated polyethylene
4 parts silica pyrogenic gas phase (Aerosil)
0.5 part alumina pyrogenic gas phase
3 parts chalk
1 part talc
12 parts pigments
5 parts Circo light process oil
0.5 part petroleum jelly
12 parts magnesium oxide
0.1 part UV absorber (Uvinul 400 Antara Chemicals New York)
2.3 parts reaction product ethylene diamine and crotonaldehyde
0.2 part reaction product hexamethylene diamine and benzaldehyde
1.9 parts reaction product tetraethylene pentamine and benzaldehyde
4.4 parts toluylene diisocyanate was dissolved in 30 parts toluene
30 parts xylene
20 parts ethyl acetate
20 parts methyl ethyl ketone
20 parts benzine 80/110 and painted over the previously applied predried coating and similarly dried. The coated fabric was then heated for several minutes at about 135° C. to effect vulcanization of the coatings.

*Example 2*

A sheet consisting of a mixture of:

100 parts poly-2-chlorobutadiene
50 parts flame black
3 parts chalk
8 parts asbestos
11 parts Plastikator FH
14 parts tribasic lead maleate
5.3 parts reaction product ethylene diamine and benzaldehyde
0.9 part N,N'-mercaptoimidazole-N,N'-dimethylol dianisidine

*Example 2—Continued*

1.2 parts sulfur
0.3 part tetramethyl thiuram disulfide
0.4 part piperidine cyclopentamethylene dithiocarbamate
6.6 parts methylene-bis-(4-phenyl-isocyanate)

was applied over a sheet consisting of a mixture of:

100 parts chlorosulfonated polyethylene
2 parts flame black
0.8 part silica precipitated (Durosil)
14 parts chalk
6 parts talc
1 part titanium oxide
8 parts pigments
5 parts asbestos
6 parts Circo light process oil
0.8 part polyethylene
0.1 part silicone oil (viscosity 2000 cst.)
16 parts magnesium oxide
4.9 parts reaction product ethylene diamine and cinnamic aldehyde
1.3 parts reaction product decamethylene diamine and cinnamic aldehyde
0.8 part propylene-1,3-N'-bis-(methylol-N-barbituric acid)
4.0 parts hexamethylene-diisocyanate
0.2 part naphthalene diisocyanate and heated to a temperature of about 130° C. for about 5 minutes under a pressure of about 10 kg./cm.$^2$.

*Example 3*

Similarly to Example 1, solutions of masses of the following composition were painted over each other and vulcanized.

Solution 1:
  2 parts poly-2-chlorobutadiene
  100 parts chlorinated rubber
  20 parts flame black
  0.2 part silica pyrogenic gas phase
  0.1 part alumina pyrogenic gas phase
  0.2 part magnesium oxide
  4.5 parts reaction product hexamethylene diamine-benzaldehyde
  0.1 part N,N'-dimethylol piperazine
  3.5 parts triphenylmethane triisocyanate in
  80 parts toluene
  10 parts xylene
  70 parts ethyl acetate
  30 parts methyl ethyl ketone
  10 parts benzine 80/110

Solution 2:
  100 parts poly-2-chlorobutadiene
  20 parts flame black
  20 parts gas black
  1.5 parts silica pyrogenic gas phase
  2.0 parts talc
  5.0 parts Plastikator FH
  16 parts tribasic lead maleate
  4.0 parts reaction product tetraethylene pentamine and benzaldehyde
  2.9 parts dipropylene-N,N',N"-trimethyl-N,N'-dimethylol triamine
  2.8 parts hexamethylene-diisocyanate
  4 parts triphenylmethane-triisocyanate in
  30 parts toluene
  60 parts xylene
  30 parts ethyl acetate
  20 parts methyl ethyl ketone
  20 parts benzine 80/110

*Example 4*

Similarly to Example 1, solutions of the following composition were painted over each other and vulcanized.

Solution 1:
  2 parts poly-2-chlorobutadiene
  100 parts chlorinated rubber
  2 parts flame black
  0.2 part silica pyrogenic gas phase
  0.1 part alumina pyrogenic gas phase
  0.2 part magnesium oxide
  4.8 parts reaction product hexamethylene diamine and benzaldehyde
  0.1 part N,N'-dimethylol piperazine dissolved in
  80 parts toluene
  10 parts xylene
  70 parts ethyl acetate
  30 parts methyl ethyl ketone
  10 parts benzine 80/110

Solution 2:
  100 parts chlorosulfonated polyethylene
  16 parts silica precipitated (Durosil)
  4 parts alumina pyrogenic gas phase
  40 parts chalk
  20 parts talc
  12 parts pigments
  8 parts Circo light process oil
  0.4 part petroleum jelly
  0.3 part polyethylene
  0.1 part silicone oil (viscosity 2000 cst.)
  12.0 parts tribasic lead maleate
  0.05 part UV absorber (Uvinul 400)
  0.3 part reaction product ethylene diamine crotonaldehyde
  5.3 parts reaction product dipropylene triamine isobutyraldehyde
  0.2 part N,N'-dimethyl-N,N'-dimethylol-hexamethylene-diamine
  4.6 parts toluylene-2,4-diisocyanate dissolved in
  40 parts toluene
  40 parts xylene
  50 parts ethyl acetate
  50 parts methyl ethyl ketone
  40 parts benzine 80/110

*Example 5*

A solution of the following composition was applied and dried as in Example 1:

2 parts poly-2-chlorobutadiene
100 parts chlorinated rubber
2 parts flame black
0.2 part silica (Aerosil)
0.1 part alumina pyrogenic gas phase
0.2 part magnesium oxide
3.5 parts hexamethylene-diisocyanate
2.8 parts naphthalene diisocyanate dissolved in
  80 parts toluene
  10 parts xylene
  70 parts ethyl acetate
  30 parts methyl ethyl ketone
  10 parts benzine 80/110

Then a sheet of the following composition was applied thereover:

100 parts chlorosulfonated polypropylene
2 parts gas black
4 parts Plastikator FH
0.1 part silicone oil viscosity 2000 cst.
3.0 parts zinc oxide
5.3 parts reaction product hexamethylene diamine aceto acetic acid ester
2.2 parts dimethylol piperazine and vulcanized at 140° C. for several minutes under a pressure of 50 kg./cm.$^2$.

Example 6

A sheet of the following composition:

100 parts poly-2-chlorobutadiene
5 parts flame black
3 parts Plastikator FH
5 parts magnesium oxide
3.3 parts reaction product ethylene diamine and crotonaldehyde
1.6 parts of N,N'-dimethyl-N,N'-dimethylol-hexamethylene diamine
1 part sulfur
0.4 part piperidine cyclopentamethylene dithiocarbamate
3.0 parts methylene-bis-(4-phenyl-isocyanate)

was applied over a sheet consisting of a mixture of:

100 parts chlorosulfonated propylene
2 parts silica (Aerosil)
6 parts chalk
2 parts talc
8 parts pigments
4 parts Circo light process oil
7 parts magnesium oxide
0.1 part Uvinul 400
3.5 parts reaction product ethylene diamine and crotonaldehyde
1.6 parts N,N'-dimethyl-N,N'-dimethylol hexamethylene diamine
4.1 parts toluylene diisocyanate and vulcanized at 130° C. for about 5 minutes under a pressure of 75 kg./cm.$^2$.

Example 7

A solution of the following composition was applied and dried as in Example 1:

5 parts poly-2-chlorobutadiene
95 parts chlorinated rubber
4 parts flame black
3.5 parts reaction product ethylene diamine and benzaldehyde
0.2 part reaction product p,p-dinitroso biphenyl and malonic acid ester
0.2 part N,N'-mercaptoimidazole-N,N'-dimethylol dianisidine
4.0 parts methylene-bis-(4-phenyl-isosyanate)
0.8 part naphthalene diisocyanate in 60 parts toluene
20 parts xylene
60 parts ethyl acetate
40 parts methyl ethyl ketone Then a sheet of the following composition was applied thereover:

100 parts copolymer hexafluoropropylene-vinylidene fluoride
20 parts gas black
5 parts Plastikator FH
6 parts tribasic lead maleate
4.8 parts reaction product ethylene diamine and benzaldehyde
1.1 parts reaction product hexamethylene diamine and benzaldehyde
0.2 part reaction product p,p'-dinitroso biphenyl and malonic acid ester
0.2 part N,N'-mercaptoimidazole-N,N'-dimethylol dianisidine
1.0 part methylene-bis-(4-phenyl-isocyanate)
2.9 parts naphthalene diisocyanate and vulcanized at 130° C. for about 8 minutes under a pressure of 20 kg./cm.$^2$.

Example 8

A solution of the following composition was applied and dried as in Example 1:

10 parts poly-2-chlorobutadiene
90 parts chlorinated rubber
3 parts gas black
3 parts Circo light process oil
0.5 part petroleum jelly
5.0 parts magnesium oxide
4.9 parts reaction product ethylene diamine and cinnamic aldehyde
0.1 part reaction product decamethylene diamine and cinnamic aldehyde
4.0 parts hexamethylene diisocyanate in 70 parts toluene
30 parts xylene
50 parts ethyl acetate
50 parts methyl ethyl ketone Then a sheet of the following composition was applied thereover:

40 parts chlorosulfonated polyethylene
60 parts chlorosulfonated polypropylene
1 part silica Aerosil
2 parts talc
4 parts titanium dioxide
4 parts pigments
4 parts Circo light process oil
0.5 part petroleum jelly
9.0 parts tribasic lead maleate
0.1 part Uvinul 400
4.9 parts reaction product ethylene diamine and cinnamic aldehyde
0.5 part reaction product decamethylene diamine and cinnamic aldehyde
5.8 parts toluylene-2,4-diisocyanate and vulcanized at 145° C. for about 8 minutes.

Example 9

A solution of the following composition was applied and dried as in Example 1:

10 parts poly-2-chlorobutadiene
90 parts chlorinated rubber
3 parts gas black
3 parts Circo light process oil
0.5 part petroleum jelly
5.0 parts magnesium oxide
0.2 part piperidine cyclopentamethylene dithiocarbamate
4.4 parts hexamethylene diisocyanate
4.8 parts toluylene-2,4-diisocyanate in 70 parts toluene
30 parts xylene
50 parts ethyl acetate
50 parts methyl ethyl ketone Then a sheet of the following composition was applied thereover:

40 parts chlorosulfonated polyethylene
60 parts chlorosulfonated polypropylene
1 part silica Aerosil
2 parts talc
4 parts titanium dioxide
4 parts pigment
4 parts Circo light process oil
0.5 part petroleum jelly
9 parts tribasic lead maleate
0.1 part Uvinul 400
8.2 parts reaction product ethylene diamine and cinnamic aldehyde
0.6 part reaction product decamethylene diamine and cinnamic aldehyde and vulcanized at 140° C. for several minutes under a pressure of 15 kg./cm.$^2$.

Example 10

A solution of the following composition was applied and dried as in Example 1:

5 parts poly-2-chlorobutadiene
95 parts chlorinated rubber
2 parts flame black
0.1 part polyethylene
0.3 part magnesium oxide
1.3 parts reaction product ethylene diamine and crotonaldehyde
2.5 parts reaction product hexamethylene diamine and benzaldehyde
0.5 part reaction product dipropylene triamine and isobutyraldehyde
3.5 parts hexamethylene diisocyanate in 70 parts toluene
30 parts xylene
50 parts ethyl acetate
50 parts methyl ethyl ketone Then a solution of the following composition was applied thereover and dried:

100 parts poly-2-chlorobutadiene
25 parts gas black
3 parts Plastikator FH
0.4 part polyethylene
5 parts magnesium oxide
3.2 parts reaction product ethylene diamine and crotonaldehyde
2.2 parts reaction product hexamethylene diamine and benzaldehyde
0.8 part reaction product dipropylene triamine and isobutyraldehyde
2.0 parts dimethylol piperazine
4.2 parts naphthalene diisocyanate in 30 parts toluene
60 parts xylene
30 parts ethyl acetate
40 parts methyl ethyl ketone Then a solution of the following composition was applied thereover and dried:

100 parts chlorosulfonated polyethylene
3 parts silica Aerosil
0.5 part alumina pyrogenic gas phase
2.0 parts chalk
16.0 parts pigments
4.0 parts Circo light process oil
0.4 part polyethylene
8 parts magnesium oxide
0.1 part Uvinul 400
4.4 parts reaction product ethylene diamine and crotonaldehyde
1.2 parts reaction product hexamethylene diamine and aceto acetic acid ester
0.9 part reaction product dipropylene triamine and isobutyraldehyde
4.6 parts toluylene-2,4-diisocyanate in 40 parts toluene
40 parts xylene
50 parts ethyl acetate
50 parts methyl ethyl ketone
40 parts benzine 80/110

Thereafter the coatings were vulcanized at 135° C. for several minutes.

Example 11

A solution of the following composition was applied and dried as in Example 1:

5 parts poly-2-chlorobutadiene
95 parts chlorinated rubber
2 parts flame black
0.1 part polyethylene
0.3 part magnesium oxide
1.3 parts reaction product ethylene diamine and crotonaldehyde
1.6 parts hexamethylene diisocyanate
4.6 parts toluylene-2,4-diisocyanate in the same solvent as the first coating in Example 10.

Then a solution of the following composition was applied thereover and dried:

100 parts poly-2-chlorobutadiene
25 parts gas black
3 parts Plastikator FH
0.4 part polyethylene
5 parts magnesium oxide
3.2 parts reaction product ethylene diamine and crotonaldehyde
2 parts dimethylol piperazine in the same solvent as the second coating of Example 10.

Thereafter a solution of the following composition was applied thereover and dried:

100 parts chlorosulfonated polyethylene
3 parts silica Aerosil
0.5 part alumina pyrogenic gas phase
2 parts chalk
16 parts pigments
4 parts Circo light process oil
0.4 part polyethylene
8 parts magnesium oxide
0.1 part Uvinul 400
4.4 parts reaction product ethylene diamine in crotonaldehyde
1.2 parts reaction product hexamethylene diamine and aceto acetic acid ester
2.4 parts reaction product dipropylene triamine and isobutyric aldehyde
2 parts hexamethylene diisocyanate
4.2 parts naphthalene diisocyanate in the same solvent as coating three of Example 10.

Thereafter the coatings were vulcanized for several minutes at 140° C.

Example 12

Three sheets of the following compositions were applied over each other and vulcanized at 145° C. for about 8 minutes under a pressure of 50 kg./cm.$^2$.

Sheet 1:
  100 parts copolymer hexafluoropropylene-vinylidene fluoride
  1 part titanium dioxide
  6 parts pigment
  4 parts Circo light process oil
  8 parts tribasic lead maleate
  5.5 parts toluylene-2-4-diisocyanate
  0.6 part naphthalene diisocyanate Sheet 2:
  100 parts poly-2-chlorobutadiene
  10 parts gas black
  4 parts Circo light process oil
  8 parts tribasic lead maleate
  3 parts N,N'-dimethyl-N,N'-dimethylol hezamethylene diamine
  4 parts N,N'-mercaptoimidazole-N,N'-dimethylol dianisidine

*Example 12*—Continued

Sheet 3:
- 100 parts chlorosulfonated polypropylene
- 0.5 part silica Aerosil
- 1.0 part titanium dioxide
- 5.0 parts pigment
- 4.0 parts Circo light process oil
- 8.0 parts tribasic lead maleate
- 5.5 parts toluylene-2,4-diisocyanate
- 0.6 part naphthalene diisocyanate

We claim:

1. A process for bonding a layer of a halogen containing rubber selected from the group consisting of poly-2-halobutadiene, halo sulfonated polyethylene, halo sulfonated propylene, halogenated natural rubber, rubber hydrohalide, polychloro trifluoroethylene and hexafluoro propylene-vinylidene fluoride copolymers with the surface of a layer of another halogen containing rubber selected from said group which comprises associating such layers in bonding relationship in the presence of an organic polyisocyanate compound containing at least two isocyanate groups and at least one compound selected from the group consisting of Schiff's bases containing at least two —N=C< groups in non-cyclic linkage of the formula

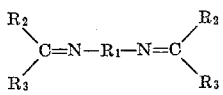

wherein $R_1$ represents a radical selected from the group consisting of aliphatic radicals containing 1 to 18 carbon atoms, araliphatic radicals containing up to 24 carbon atoms, cycloaliphatic radicals containing up to 24 carbon atoms and heterocyclic radicals containing up to 20 carbon atoms, the carbon atoms in such radicals only being bonded to at least one of the following atoms: hydrogen, oxygen, carbon, nitrogen, sulfur and phosphorus, $R_2$ and $R_3$ represent a member selected from the group consisting of hydrogen, aliphatic radicals containing 1 to 18 carbon atoms, araliphatic radicals containing up to 24 carbon atoms, cycloaliphatic radicals containing up to 24 carbon atoms and heterocyclic radicals containing up to 20 carbon atoms, the carbon atoms in such radicals only being bonded to at least one of the following atoms: hydrogen, oxygen, carbon, nitrogen, sulfur and phosphorus and monomeric N,N'-dimethylol compounds of polyamines of the formula $$HOH_2C-\underset{R}{N}-A-\underset{R'}{N}-CH_2OH$$

wherein A is a divalent radical selected from the group consisting of (I) $-(CH_2)_n-$ (II) $-\overset{O}{\underset{\|}{C}}(CH_2)_n\overset{O}{\underset{\|}{C}}-$ (III) $-\overset{O}{\underset{\|}{C}}-$ (IV) $-\overset{O}{\underset{\|}{C}}-\underset{R}{N}-(CH_2)_n-\underset{R'}{N}-\overset{O}{\underset{\|}{C}}-$ (V) 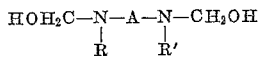

wherein each of R and R' taken separately are selected from the group consisting of hydrogen, aliphatic radicals containing 1–18 carbon atoms, aromatic radicals containing up to 24 carbon atoms, araliphatic radicals containing up to 24 carbon atoms and heterocyclic radicals containing up to 20 carbon atoms and R and R' taken together form a closed ring; R" is the same as R and R' taken separately; $n$ is a number from 0 to 18 and $m$ is a number from 2 to 8; and applying heat to such associated layers to effect the bond, the quantity of each of said compounds employed being 0.1 to 8% by weight based upon the rubber content of such layers.

2. The process of claim 1 in which said bonding is effected at a temperature between 80 and 140° C.

3. The process of claim 1 in which said bonding is effected by application of heat and pressure.

4. The process of claim 1 in which each of the layers to be bonded contains such compounds.

5. The process of claim 1 in which one of the layers to be bonded contains the first mentioned compound and the other contains the second mentioned compound.

6. The process of claim 1 in which one of said compounds is applied as an intermediate layer between the layers to be bonded and the other is contained in the layers to be bonded.

7. The process of claim 1 in which all of said associated layers are vulcanized simultaneously while in bonding relationship.

8. The process of claim 1 in which the quantity of each of said compounds employed is 0.2 to 4% by weight based upon the rubber content of such layers.

9. The process of claim 1 in which said layers also contain up to 200% by weight of a filler.

10. The process of claim 1 in which at least one of said layers also contains a sulfur vulcanizing agent selected from the group consisting of sulfur and organic sulfur compounds in a quantity of 0.1 to 8% by weight based upon the rubber content of such layer.

11. The process of claim 1 in which the radical $R_1$ joins the nitrogen atoms shown by a chain containing less than 19 carbon atoms.

12. The process of claim 1 in which $R_1$ is a radical selected from the group consisting of alkylene radicals containing 2 to 10 carbon atoms, alkylene radicals containing 2–10 carbon atoms in which the chain is interrupted by at least one nitrogen atom of an amino group and $R_2$ and $R_3$ are selected from the group consisting of hydrogen, aliphatic, aromatic, araliphatic, cycloaliphatic and heterocyclic radicals containing up to 12 carbon atoms.

References Cited by the Examiner

UNITED STATES PATENTS

| | | | |
|---|---|---|---|
| 2,826,526 | 3/58 | Meyrick | 154—140 |
| 2,835,624 | 5/58 | Cousins | 154—140 |
| 2,837,458 | 6/58 | Coleman | 154—139 |

FOREIGN PATENTS

| | | |
|---|---|---|
| 806,450 | 12/58 | Great Britain. |
| 515,880 | 8/55 | Canada. |

OTHER REFERENCES

Szmant, H. H.: Organic Chemistry, p. 349, 1957, Prentice-Hall, Englewood Cliffs, N.J.

Ellis, Carleton: The Chemistry of Synthetic Resins (2 volumes bound together) vol. 1, pp. 576–578, Reinhold Publishing Co., N.Y.

EARL M. BERGERT, *Primary Examiner.*

ALEXANDER WYMAN, *Examiner.*